(12) United States Patent
Sinegre et al.

(10) Patent No.: US 11,143,701 B2
(45) Date of Patent: Oct. 12, 2021

(54) METHOD FOR MANAGING A RETURN OF A PRODUCT FOR ANALYSIS AND CORRESPONDING PRODUCT

(71) Applicant: STMicroelectronics (Rousset) SAS, Rousset (FR)

(72) Inventors: Lionel Sinegre, Nice (FR); Eric Sagnard, Le Cannet (FR); Stephan Courcambeck, Plan de Cuques (FR); William Orlando, Peynier (FR); Layachi Daineche, Bouc-bel-Air (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 0 days.

(21) Appl. No.: 16/909,696

(22) Filed: Jun. 23, 2020

(65) Prior Publication Data

US 2020/0319247 A1   Oct. 8, 2020

Related U.S. Application Data

(63) Continuation of application No. 16/155,953, filed on Oct. 10, 2018, now Pat. No. 10,705,141.

(30) Foreign Application Priority Data

Oct. 11, 2017 (FR) ...................................... 1759500

(51) Int. Cl.
*G01R 31/00* (2006.01)
*G01R 31/317* (2006.01)
(Continued)

(52) U.S. Cl.
CPC . *G01R 31/31719* (2013.01); *G01R 31/31705* (2013.01); *G06F 9/4401* (2013.01);
(Continued)

(58) Field of Classification Search
None
See application file for complete search history.

(56) References Cited

U.S. PATENT DOCUMENTS

| 6,769,622 B1 | 8/2004 | Tournemille et al. |
| 7,248,069 B2 | 7/2007 | Moyer et al. |
| (Continued) | | |

FOREIGN PATENT DOCUMENTS

EP   1785905 A1   5/2007

OTHER PUBLICATIONS

W. Shi, J. B. Fryman, G. Gu, H.-. S. Lee, Y. Zhang and J. Yang, "InfoShield: a security architecture for protecting information usage in memory," The Twelfth International Symposium on High-Performance Computer Architecture, 2006., 2006, pp. 222-231, doi: 10.1109/HPCA.2006.1598131. (Year: 2006).*

(Continued)

*Primary Examiner* — Daniel F. McMahon
(74) *Attorney, Agent, or Firm* — Slater Matsil, LLP

(57) ABSTRACT

A method for managing a product includes: placing an integrated circuit in a bootstrap mode with debugging prohibition in response to each reset or power-up of the integrated circuit and in an absence of a reception, on a test access port of the product, of a first command; and placing the integrated circuit in an analysis mode with debugging authorization in response to reception, on the test access port, of the first command following the reset or the power-up of the integrated circuit. Placing the integrated circuit in the analysis mode is maintained at least as long as a second command has not been received on the test access port. Placing the integrated circuit in the bootstrap mode and placing the integrated circuit in the analysis mode are performed in response to a determination that the integrated (Continued)

circuit has never before been placed in the analysis mode with debugging authorization.

20 Claims, 6 Drawing Sheets

(51) Int. Cl.
    *G06F 11/22*     (2006.01)
    *G06F 9/4401*     (2018.01)
    *G06F 11/36*     (2006.01)
    *G06F 21/75*     (2013.01)
    *G06F 21/62*     (2013.01)

(52) U.S. Cl.
    CPC .......... *G06F 11/22* (2013.01); *G06F 11/3656* (2013.01); *G06F 21/62* (2013.01); *G06F 21/75* (2013.01)

(56) References Cited

U.S. PATENT DOCUMENTS

| | | |
|---|---|---|
| 7,266,848 B2 | 9/2007 | Moyer et al. |
| 8,010,843 B2 | 8/2011 | Righi et al. |
| 8,832,843 B2 | 9/2014 | Yoon |
| 2002/0010856 A1 | 1/2002 | Kawasaki et al. |
| 2005/0193220 A1 | 9/2005 | Little et al. |
| 2006/0282734 A1 | 12/2006 | Milne et al. |
| 2008/0082828 A1 | 4/2008 | Jennings et al. |
| 2008/0282087 A1 | 11/2008 | Stollon et al. |
| 2008/0288808 A1* | 11/2008 | Moyer ................ G06F 11/3656 714/2 |
| 2009/0288160 A1 | 11/2009 | Esliger et al. |
| 2010/0017615 A1 | 1/2010 | Boesgaard Sorensen |
| 2010/0199077 A1 | 8/2010 | Case et al. |
| 2010/0263043 A1 | 10/2010 | Xu |
| 2011/0246707 A1* | 10/2011 | Ito ...................... G06F 12/0246 711/103 |
| 2014/0044265 A1 | 2/2014 | Kocher et al. |
| 2015/0334221 A1 | 11/2015 | Lamotte |
| 2018/0189493 A1* | 7/2018 | Schilder ................ H04L 9/0861 |

OTHER PUBLICATIONS

Kochte, Michael, et al., "Specification and verification of security in reconfigurable scan networks," 2017 22nd IEEE European Test Symposium (ETS), Limassol, 2017, pp. 1-6. (Year: 2017).

* cited by examiner

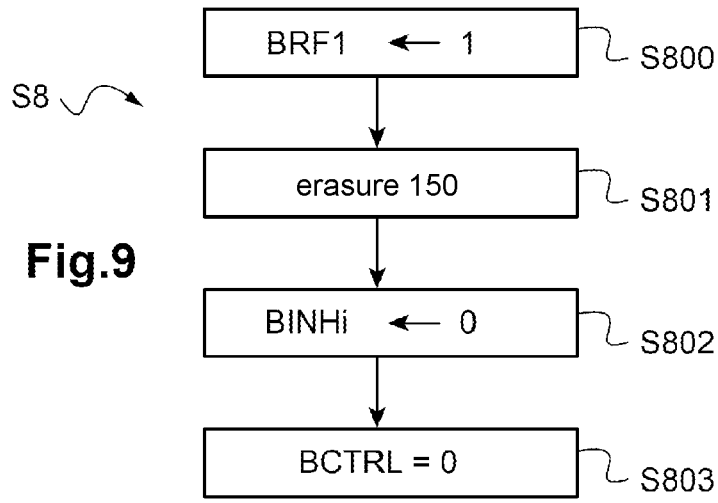
Fig.9
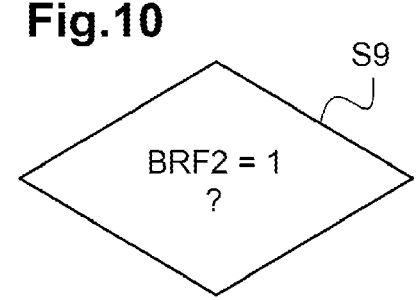
Fig.10
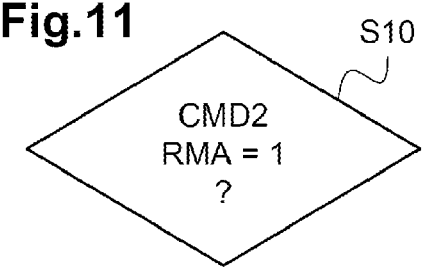
Fig.11
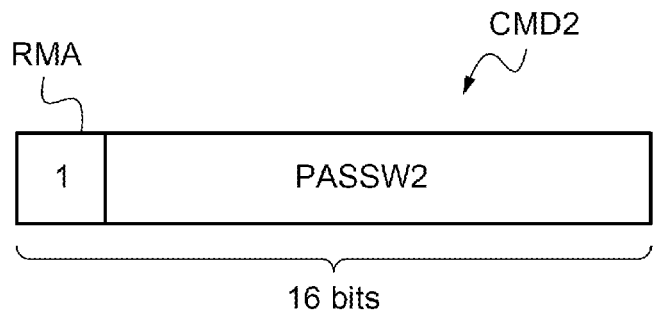
Fig.12
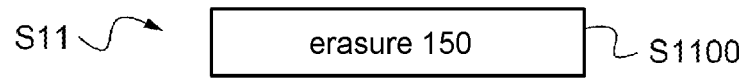
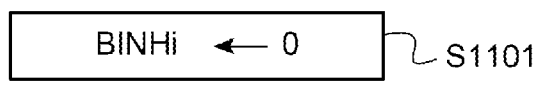
Fig.13
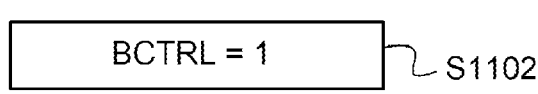

Fig.14
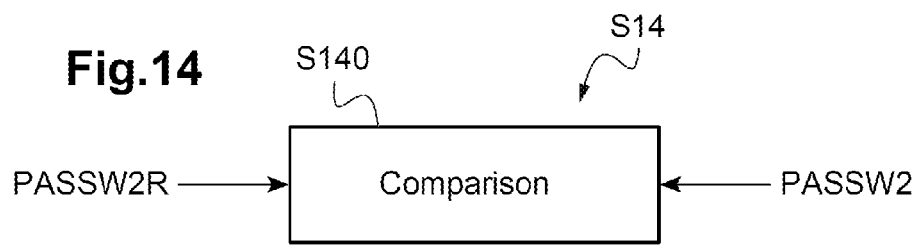
Fig.15
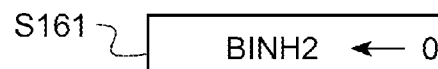
Fig.16
Fig.17
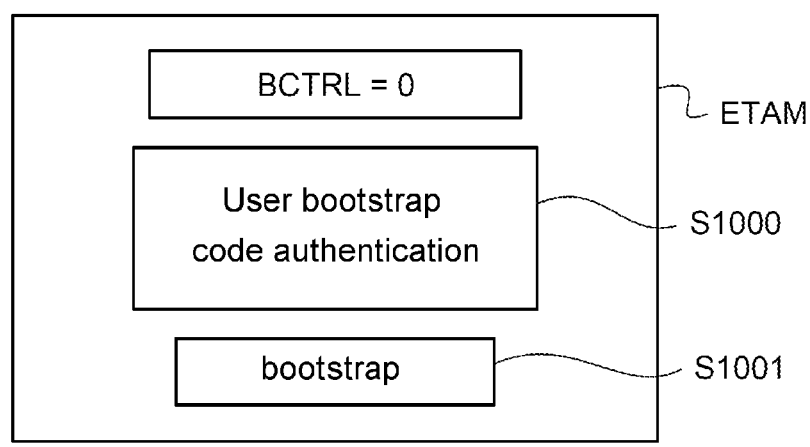

METHOD FOR MANAGING A RETURN OF A PRODUCT FOR ANALYSIS AND CORRESPONDING PRODUCT

CROSS-REFERENCE TO RELATED APPLICATIONS

This application is a continuation of U.S. application Ser. No. 16/155,953, filed on Oct. 10, 2018, which claims priority to French Patent Application No. 1759500, filed on Oct. 11, 2017, which applications are hereby incorporated herein by reference in their entirety.

TECHNICAL FIELD

Implementations and embodiments of this disclosure relate generally to the hardware or products including at least one integrated circuit, for example a system on chip, and in particular embodiments, to a method for managing a return of a product for analysis and a corresponding product.

BACKGROUND

In some cases, pieces or products, for example including systems on chip, are, after fabrication, delivered to a final user who can incorporate sensitive data therein, for example cryptography keys or even secrets which are specific to the final user.

This final user, when he or she wants to preserve the sensitive data contained in the piece, has the possibility of switching to a so-called "closed" state. In this state, the sensitive data and/or secrets remain accessible but only in a very controlled way (for example by using a secure bootstrap code of the processor of the system on chip and/or an authentication of this code) upon the execution on the processor of the application of the final user.

Some of these pieces, including "closed" pieces, may be subject to malfunctions. To analyze a "closed" piece, it is necessary first of all to open up the possibility of debugging.

In effect, failure analysis generally uses a debugging tool which will make it possible to probe and send test patterns to different components of the system on chip so as to try to find the cause of the malfunction.

In the "closed" state of a piece, the opening of the debugging can be performed upon the execution of the application of the final user, if the program code of this application provides this opening possibility. That therefore requires the execution of this application at the final user level.

The final user may decide to entrust the failure analysis (which will necessitate an opening of the debugging) to a third party, for example to the manufacturer and/or to the designer of the product.

There is then a need to offer the possibility of placing a product, initially in a "closed" state, in a mode in which opening the possibility of debugging is authorized subject to certain conditions, while, if necessary, preserving the confidentiality of the sensitive data and/or secrets, but independently of the application of the final user, that is to say, without it being necessary to execute this application.

Moreover, there is a need, independently of the presence or not of sensitive data in the system on chip to be analyzed, to facilitate the access to the debugging mode.

Finally, it may be advantageous, to offer the possibility for the final user to recover his or her product, once analyzed and possibly repaired, in a "closed" state, identical to the state the product was in before analysis, but then prohibiting any new possibility of analysis by a third party.

In other words, such a product restored to the "closed" state can no longer be the subject of any analysis by debugging by the manufacturer itself for example.

SUMMARY

Thus it is proposed, according to implementations and embodiments, to authorize, subject to certain conditions and in a controlled manner, the opening of a debugging of a product of a final user, without it being necessary to execute an application of the final user.

It is also proposed in particular to authorize such an opening of debugging on a "closed" product containing sensitive data and/or secrets, by preserving, upon the opening of the debugging and during the debugging, the confidentiality of these sensitive data and/or secrets, for example by rendering them inaccessible.

It is also advantageously proposed that this controlled opening of the debugging, with, if necessary, preservation of confidentiality of the sensitive data and/or secrets, be able to be performed by the final user before the latter returns the product for analysis, or even by the manufacturer or the designer receiving the product in its "closed" state.

In these respects, it is proposed, according to implementations and embodiments, to use, in combination, a hardware mechanism, a memory of single-write type (One-Time Programmable(OTP) memory, for example) and program instructions incorporated in the bootstrap read-only memory (boot ROM) associated with the central processing unit of the system on chip.

Moreover, according to an implementation, this method for managing return of a product for analysis is implemented advantageously on each reset or power-up of the integrated circuit and the activation of this method is always accessible via, advantageously, a test access port, for example conforming to the Joint Test Action Group (JTAG) standard.

According to one aspect, there is thus proposed a method for managing return of a product for analysis, the product (for example a component) including an integrated circuit, for example a system on chip, having a test access port, for example conforming to the JTAG standard, a bootstrap mode with debugging prohibition and an analysis mode with debugging authorization.

The method according to this aspect includes, when the integrated circuit has never been placed in its analysis mode with debugging authorization, placement of the integrated circuit in its bootstrap mode with debugging prohibition in response to each reset or power-up of the integrated circuit and in the absence of reception on the test access port of a first command accompanied by a first valid password. The method further includes placement of the integrated circuit in its analysis mode with debugging authorization, in the presence of a reception on the test access port, of the first command accompanied by the first valid password following a reset or a power-up, this placement being maintained at least as long as no second command accompanied by a second valid password has been received on the access port.

In other words, if the integrated circuit has never been placed in its analysis mode with debugging authorization, then it is possible to place this integrated circuit in its analysis mode with debugging authorization subject to certain conditions.

It should be noted here, as will be recalled in detail hereinbelow, that, according to a preferred implementation, if the integrated circuit has already been placed in its analysis mode with debugging authorization and it is once again in a bootstrap mode with debugging prohibition after the analysis has been done, it is then no longer possible to place it once again in an analysis mode with debugging authorization.

That being so, it would also be possible, in some applications, to authorize at least one repetition of the aforementioned steps of placement of the integrated circuit in its bootstrap mode with debugging prohibition and placement of the integrated circuit in its analysis mode with debugging authorization following the return of the piece to its restored state.

The placement of the integrated circuit in its analysis mode with debugging authorization is possible when (e.g. only when) a first command accompanied by a first valid password is received on the test access port. Moreover, as long as a second command accompanied by a second valid password is not received, the integrated circuit is maintained in its analysis mode with debugging authorization, even if the integrated circuit has to be reset, switched off and powered up again.

Thus, the access to the analysis mode with debugging authorization is facilitated in as much as it is not necessary, on each reset or each power-up, to return a password to be able to replace the integrated circuit in the analysis mode with debugging authorization.

This facility to access the analysis mode with debugging authorization is particularly advantageous when the application of the aforementioned steps is performed by the user of the system, because it is he or she who then delivers the first valid password, which allows him or her to restore to the manufacturer or to the designer, a system with debugging open, without the manufacturer or the designer having to be concerned with re-entering any password on each power-up or reset of the system.

That said, even if in general the application of the aforementioned steps is preferentially performed by the user of the system, this application could also be performed if necessary by the manufacturer or the designer, provided that the latter knows the first valid password.

According to one implementation, it is possible, but not essential, for the step of placement of the integrated circuit in its analysis mode with debugging authorization to include, following the reset or power-up of the integrated circuit, a first substep of placement of the integrated circuit in a waiting mode with debugging prohibition, and a second substep of placement of the integrated circuit in its analysis mode with debugging authorization, this second substep being performed only following each subsequent reset or power-up of the integrated circuit.

In other words, although it would have been possible to place the integrated circuit in its analysis mode with debugging authorization following the first reset or power-up of the integrated circuit, a choice is made here to switch via an intermediate step (the first substep), that is to say via a waiting mode with debugging prohibition, and to authorize the debugging only following the next reset or power-up and following each subsequent reset or power-up.

The application of this first substep leading to a placement in a waiting mode makes it possible to simplify the number of states and paths to be validated in the stream of the program instructions contained in the bootstrap memory and makes it possible to force the switch via a reset or a power-up which is a simple way to be sure of restarting from a "clean" state and to guarantee that no confidential value remains in accessible volatile registers, which is particularly advantageous in the case where the integrated circuit includes sensitive data to be protected.

Whether or not the first substep is applied, the step of placement of the integrated circuit in its analysis mode with debugging authorization advantageously includes at least one comparison of the first password received with a first reference password stored in a first memory.

In practice, this first reference password has been stored by the final user of the product.

And, in case of success of the at least one comparison, the first password is then considered as valid.

And if the first password is considered as valid, then storage of a first reference bit having a first reference logic value in the memory of single-write type is then performed.

In practice, it is possible to authorize several tests, for example three, to determine whether the password received is valid or invalid. In other words, it is possible to authorize, for example, three successive comparisons with three successive passwords received.

Moreover, as soon as the password is considered valid, a first reference bit is stored with a first reference logic value, for example the logic 1 value, in the memory of single-write type, that is to say that this storage is performed in an ongoing manner. And, it is this first reference bit with its first reference logic value which will signify a future switch to the analysis mode with debugging authorization or else signify a prior switch to the analysis mode with debugging authorization.

The authorization or the prohibition of debugging for example includes the verification of the logic value of at least one control bit. This control bit can for example be a bit authorizing the test of the chip and that can for example be designated by the abbreviation TESTen (denoting Test enable).

Thus, the debugging prohibition corresponds to a first control logic value of the at least one control bit, for example the logic 0 value, whereas the debugging authorization corresponds to a second control logic value, for example the value 1, of the at least one control bit.

In other words, as long this control bit has the value 0, only the access to the first JTAG controller (in the case where the test access port conforms to the JTAG standard) of the test chain used in the JTAG protocol, is possible, but the propagation of the test instructions to the other JTAG controllers of the chain is prohibited.

However, when the control bit takes the value 1, then the chain is opened and it is possible to proceed with the debugging of at least some of the elements of the integrated circuit via the other controllers of the test chain, for example the JTAG test chain.

Obviously, several control bits can be assigned to the debugging authorization or prohibition.

Thus, according to one implementation, following each reset or power-up of the integrated circuit, the first control logic value, typically the value 0, is conferred on the at least one control bit, and this first control logic value is maintained in the bootstrap mode with debugging prohibition.

When, in the above step of placement of the integrated circuit in its analysis mode with debugging authorization, the first substep and the second substep mentioned above are implemented, it is then possible to maintain this first control logic value (the value 0 for example) in the first substep to prohibit the debugging whereas, in the second substep, the second control logic value is conferred on the at least one control bit to authorize the debugging.

According to one implementation, allowing the restoration of the product to its "closed" state after analysis, on reception on the access port of the second command accompanied by the second valid password, a comparison of the second password received with a second reference password stored in the first memory is performed and, in case of successful comparison, the second password is considered as valid.

A second reference bit having a second reference logic value is then stored in the memory of single-write type.

Thus, just as for authorizing the switch to the analysis mode with debugging authorization, to restore the product to its closed state, a second password used, which can be identical to or different from the first password, and here again, it is possible to authorize several, for example three, tests to perform the comparison with the second reference password stored in the memory of single-write type.

And, just as for marking the switch of the integrated circuit to its analysis mode with debugging authorization, a second reference bit with a second reference logic value, for example the value 1, is permanently stored in a location of the memory of single-write type, so as to signify that the integrated circuit will be restored to its "closed" state after its analysis.

And, this will make it possible to subsequently prohibit any new cycle of analysis and then return to the "closed" state.

Here again, according to one implementation, in order, in particular, to limit the number of states in the program instructions of the bootstrap memory, after having stored the second reference bit assigned its second reference logic value in the memory of single-write type, the integrated circuit is placed in a waiting mode with debugging prohibition and, it is verified after the next reset or power-up of the integrated circuit that the second reference bit does indeed have its second reference logic value, and if such is the case, the integrated circuit is then placed in its bootstrap mode with debugging prohibition.

In the waiting mode with debugging prohibition, the first control logic value is advantageously maintained for the at least one control bit (for example the TESTen bit).

When the integrated circuit contains sensitive data, for example encryption/decryption keys or secrets of the user, it is preferable to more strongly lock the analysis management process so that these sensitive data and/or secrets cannot be accessible during the analysis with debugging.

This is particularly advantageous when the opening of the debugging is performed by the user, because this method offers the user of the system the certainty of being able to return to the manufacturer or to the designer, a system with debugging open but with the sensitive data and/or the secrets inaccessible to a third party.

Obviously, the method offers this advantage of preservation of the secrets even if the method is applied by the manufacturer or the designer.

In this respect, the integrated circuit includes a central processing unit, a memory circuit including the first memory and the memory of single-write type, and volatile registers for example referred to as volatile "shadow registers" associated with the memory circuit, accessible by the central processing unit of the integrated circuit and intended to be loaded with at least a part of the content of the memory circuit.

In other words, the central processing unit will read and/or write in these volatile registers instead of directly accessing the memory circuit.

The first memory may or may not be of single-write type.

According to one implementation, the placement in the analysis mode with debugging authorization includes, before authorizing the debugging, an erasure of the content of the volatile registers and an inhibition of reading of the volatile registers, of writing in the volatile registers and of reloading of the volatile registers.

In this way, the secrets and sensitive data remain present in the first memory but are no longer accessible by the central processing unit via the volatile registers.

According to one implementation, the inhibition is controlled by the switch from a first logic value to a second logic value of at least one inhibition bit. And, when the at least one inhibition bit is switched from its first logic value to its second logic value, only a reset or a power-up of the integrated circuit makes the at least one inhibition bit return to its first logic value.

Obviously, the first logic value and the second logic value depend on the hardware implementation of this inhibition function.

Thus, according to one implementation, when the first memory includes memory locations storing sensitive data including the first reference password, and the memory of single-write type includes a first memory location storing the first reference bit, it is then possible to assign three inhibition bits respectively dedicated to the inhibition of reading, writing and reloading of the volatile registers associated with the memory locations storing the sensitive data, and three inhibition bits respectively dedicated to the inhibition of reading, writing and reloading of the shadow register associated with the first memory location.

Similarly, in the variant providing the possibility of restoring the product to its "closed state" before return to the user, the memory locations storing sensitive data can also store the second reference password.

The memory of single-write type can then also include a second memory location storing the second reference bit.

It is then possible to assign three other inhibition bits respectively dedicated to the inhibition of reading, writing and reloading of the shadow register associated with the second memory location.

Preferentially, after reception of the second command accompanied by the second valid password, any new subsequent placement of the integrated circuit in its analysis mode with debugging authorization is prohibited.

In other words, as explained above, during the life of the product, an "analysis and return" cycle is authorized only once.

This prohibition of any new subsequent placement of the integrated circuit in its analysis mode with debugging authorization can be applied when the first reference bit has its first reference logic value (for example the value 1) and the second reference bit has its second reference logic value (for example the logic 1 value).

As indicated above, it would be possible to authorize several analysis and restoration cycles, for example by providing at least one first additional reference bit and at least one second additional reference bit, each pair of first and second additional reference bits being assigned to an additional analysis and restoration cycle.

In other words, according to another possible implementation, after reception of the second command accompanied by the second valid password, at least one new subsequent placement of the integrated circuit in its analysis mode with debugging authorization is authorized.

According to another aspect, there is proposed a product including an integrated circuit, for example a system on chip, capable of operating, in response to each reset or power-up, in a bootstrap mode with debugging prohibition or in an analysis mode with debugging authorization.

The integrated circuit includes a test access port, for example conforming to the JTAG standard, and a control circuit configured to, when the integrated circuit has never been placed in its analysis mode with debugging authorization, take: (1) in response to each reset or power-up of the integrated circuit and in the absence of reception on the test access port of a first command accompanied by a first valid password, a first state in which they are able to place the integrated circuit in its bootstrap mode with debugging prohibition; and (2) in the presence of a reception on the test access port, of the first command accompanied by the first valid password following a reset or a power-up, take a second state in which they are able to place the integrated circuit in its analysis mode with debugging authorization, and keep the integrated circuit in its analysis mode with debugging authorization at least as long as a second command accompanied by a second valid password is not received.

According to one embodiment, the control circuit is, in its second state, configured: (1) to place the integrated circuit in a waiting mode with debugging prohibition, following the reset or power-up of the integrated circuit; and (2) to place the integrated circuit in its analysis mode with debugging authorization, following each subsequent reset or power-up of the integrated circuit.

According to one embodiment, the integrated circuit further includes a central processing unit or processing unit, a bootstrap memory and a memory circuit including the first memory and the memory of single-write type, and the control circuit is distributed at least in the processing unit, the bootstrap memory, and the memory circuit.

They are also advantageously distributed in a hardware circuit able to cooperate with the processing unit.

They advantageously include a program code housed in the bootstrap memory.

The control circuit is advantageously accessible from outside the integrated circuit only via the test access port.

According to one embodiment, the control circuit is configured to, in the second state: (1) perform at least one comparison of the first password received with a first reference password stored in the first memory, the first password being considered as valid in case of success of the at least one comparison; and (2) if the first password is considered as valid, store a first reference bit with a first reference logic value in the memory of single-write type.

According to one embodiment, the control circuit is configured to, in order to place the integrated circuit in its waiting mode, perform the at least one comparison, the possible storage of the first reference bit having the first reference logic value, and prohibit the debugging. The control circuit is further configured to, in order to place the integrated circuit in its analysis mode with debugging authorization, verify that the first reference bit does indeed have the first reference logic value and, if such is the case, authorize the debugging.

The integrated circuit is considered as never having been placed in its analysis mode for example when the first reference bit has a logic value different from the first reference logic value.

According to one embodiment, the control circuit is configured to verify the logic value of at least one control bit, the debugging prohibition corresponding to a first control logic value of the at least one control bit and the debugging authorization corresponding to a second control logic value of the at least one control bit. The control circuit is further configured to, following each reset or power-up of the integrated circuit, confer on the at least one control bit the first control logic value, and to maintain this first control logic value in the bootstrap mode with debugging prohibition.

The control circuit is advantageously configured to maintain this first control logic value in the waiting mode to prohibit the debugging, and to confer on the at least one control bit the second control logic value to authorize the debugging in the analysis mode with debugging authorization.

According to one embodiment, the control circuit is configured to, on reception on the test access port of the second command accompanied by the second valid password, perform a comparison of the second password received with a second reference password stored in the first memory, the second password being considered as valid in case of successful comparison. If the second password is considered as valid, the control circuit is configured to store in the memory of single-write type a second reference bit having a second reference logic value.

According to one embodiment, the control circuit is configured to, after having stored in the memory of single-write type, the second reference bit assigned its second reference logic value, perform the following steps: (1) place the integrated circuit in a waiting mode with debugging prohibition; (2) verify after the next reset or power-up of the integrated circuit, that the second reference bit does indeed have its second reference logic value; and (3) if such is the case, place the integrated circuit in its analysis mode with debugging authorization.

The control circuit is advantageously configured to, in the waiting mode with debugging prohibition, maintain the first control logic value for the at least one control bit.

According to one embodiment, the integrated circuit further includes volatile registers associated with the memory circuit, accessible by the central processing unit of the integrated circuit and intended to be loaded with at least a part of the memory circuit content.

The control circuit is then configured to, before authorizing the debugging, erase the content of the volatile registers.

The control circuit further includes an inhibition circuit configured to, after erasure of the content of the volatile registers, perform an inhibition of reading of the volatile registers, of writing in the volatile registers and of reloading of the volatile registers.

The hardware circuit advantageously includes at least a part of the inhibition circuit.

According to one embodiment, the inhibition circuit is coupled to the volatile registers and are configured to, in response to an inhibition request signal delivered by the central processing unit, activate the inhibition by the switch from a first state to a second state of at least one inhibition logic signal, and the inhibition circuit is configured to, when the at least one inhibition logic signal is switched from its first state to its second state, be able to deliver the inhibition logic signal having its first state only in response to a reset or a power-up of the integrated circuit.

According to one embodiment, the first memory includes memory locations storing sensitive data including the first reference password and the memory of single-write type includes a first memory location intended to store the first reference bit.

The inhibition circuit is then advantageously configured to deliver inhibition logic signals respectively dedicated to the inhibition of reading, writing and reloading of the volatile registers associated with the memory locations intended to store the sensitive data, and three inhibition logic signals respectively dedicated to the inhibition of reading, writing and reloading of the shadow register associated with the first memory location.

According to one embodiment, in which the memory locations intended to store the sensitive data are also intended to store the second reference password, and the memory of single-write type includes a second memory location intended to store the second reference bit.

The inhibition circuit is then advantageously configured to deliver three other inhibition bits respectively dedicated to the inhibition of reading, writing and reloading of the shadow register associated with the second memory location.

Preferentially, the control circuit is configured to, after reception of the second command accompanied by the second valid password, prohibit any new subsequent placement of the integrated circuit in its analysis mode with debugging authorization.

In this respect, the control circuit is for example configured to prohibit any new switch to the analysis mode with debugging authorization when the first reference bit and the second reference bit respectively have their first and second reference values.

As a variant, the control circuit can be configured to, after reception of the second command accompanied by the second valid password, authorize at least one new subsequent placement of the integrated circuit in its analysis mode with debugging authorization.

The product includes, for example, an electronic component containing the integrated circuit which can include a system on chip.

BRIEF DESCRIPTION OF THE DRAWINGS

Other advantages and features of the embodiments will become apparent on studying the detailed description of embodiments and implementations, that are in no way limiting, and the attached drawings in which:

FIGS. 1 to 19 schematically illustrate different implementations and embodiments.

DETAILED DESCRIPTION OF ILLUSTRATIVE EMBODIMENTS

Particular implementations and embodiments target in particular, when an integrated circuit includes sensitive data, for example encryption/decryption keys, authorizing the analysis by a third party (for example the designer and/or the manufacturer of the integrated circuit) different from a user of the integrated circuit, by preserving the confidential and inaccessible nature of these sensitive data.

Various embodiments relate to the management of the analysis of returned hardware (RMA: Return Material Analysis) after a user has, for example, observed operating anomalies, this analysis typically including one or more debuggings.

Figure 1:
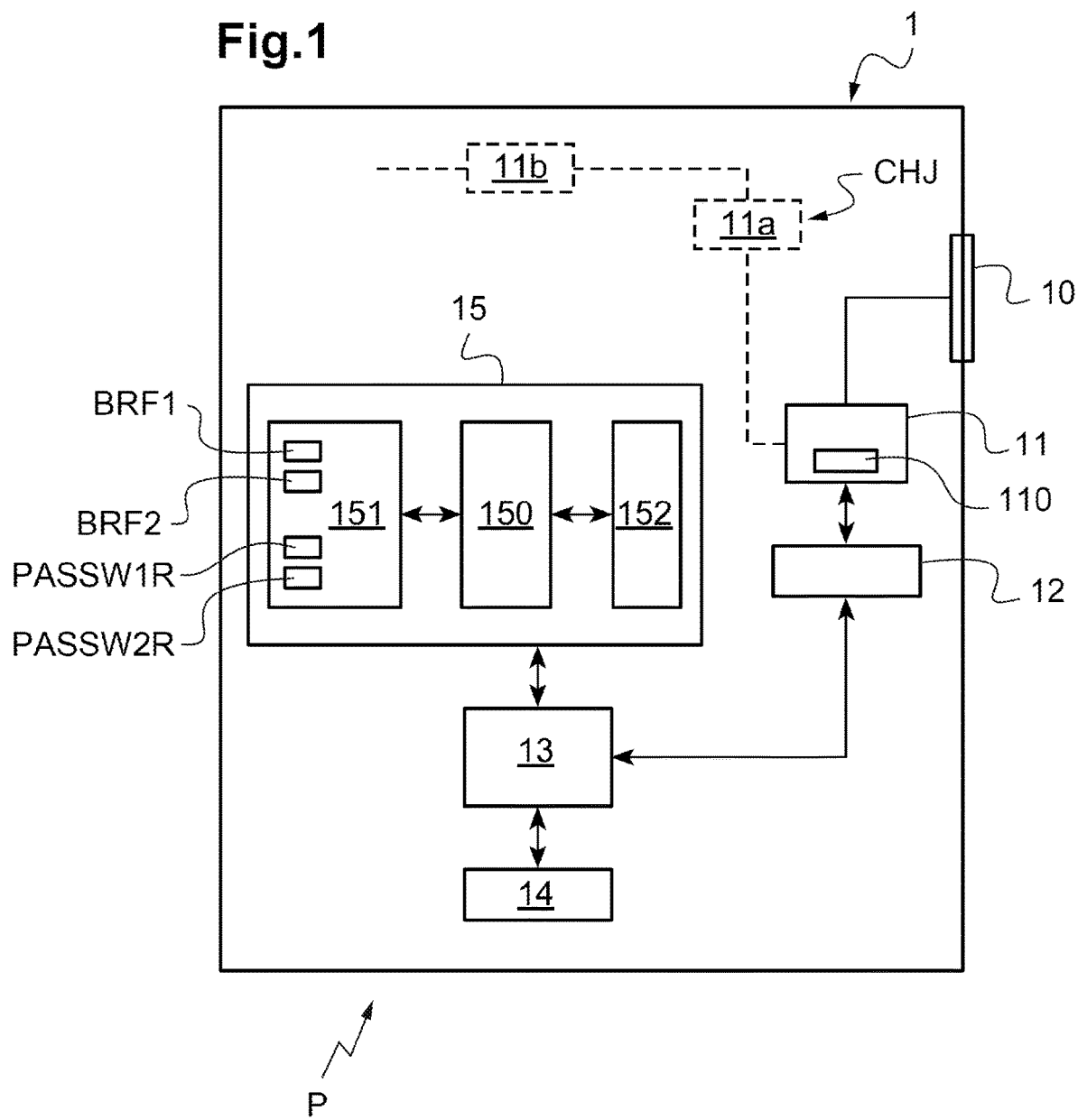

In FIG. 1, the reference 1 designates an integrated circuit, here a system on chip, incorporated in a product or electronic component P which, in this example, has to be returned by the user to the manufacturer or to the designer for an analysis in order, for example, to resolve a problem of malfunction.

Throughout the following, the system on chip is assumed to contain sensitive data or secrets of the user for which the latter wants to preserve the confidentiality during the analysis.

The system on chip 1 here includes a central processing unit 13, for example a processor or microcontroller core, associated with a bootstrap read-only memory (boot ROM).

Moreover, the system on chip 1 includes a hardware stage 15 including a memory circuit containing memory 151 of single-write type, associated with shadow registers 150, as well as a hardware circuit 152 incorporating at least a part of an inhibition circuit, as will be seen in more detail hereinbelow.

As in the conventional manner, the central processing unit 13 cooperates with instructions contained in the bootstrap memory 14 to perform the corresponding actions and also cooperates with the shadow registers 150 which are intended to serve as interfaces between the central processing unit 13 and the memory of single-write type 151. More specifically, the central processing unit 13 can, after the content of at least certain parts of the fuse memory 151 has been copied into the shadow registers 150, read the content thereof or else write in these shadow registers.

The memory of single-write type 151 can for example be memories of fuse type, called OTP (One-Time Programmable) and, generally, memory of single-write type are characterized by the fact that when a bit is written in a memory location of the memory of single-write type, the logic value of this bit thus written is fixed permanently.

Thus, although the memories of fuse type are simple to implement, it would be possible to use other types of memory as memory of single-write type, such as, for example, a rewritable memory (of the FLASH type, of phase change type (PCM: Phase Change Memory), etc.) associated with a control logic preventing a second write.

Furthermore, the memory 151 can include a single memory or else several different memories.

As will be seen in more detail hereinbelow, the memory of single-write type 151 can for example store a first reference bit BRF1, a second reference bit BRF2, a first reference password PASSW1R, and a second reference password PASSW2R.

The memory of single-write type also includes, in this case, the sensitive data and/or secrets of the user.

The system on chip 1 also includes a test access port 10.

Conventionally and as is known, this test access port 10 is connected to specific pins of the component to which signals can be delivered, for example test signals, using a specific debugging tool.

The test access port can conform to the Joint Test Action Group (JTAG) standard. It is noted that JTAG is the name of the IEEE 1149.1 standard.

That said, even if a JTAG test access port, or interface, is an interface most widely used in this field, other types of interface could be used, such as, for example, a test access interface or port conforming to the IEEE-ISTO 5001-2003 standard (NEXUS).

It would also be possible to envisage a dedicated test access port and channel coupled to a dedicated unlocking logic so as in particular to process the commands and passwords described hereinbelow.

The person skilled in the art will be able to choose the most appropriate test access port in particular as a function of the characteristics of the system on chip.

Throughout the following the test access port conforms to the JTAG standard.

As is the conventional practice in the art, to proceed with tests or debuggings of components of the system on chip, the latter includes a JTAG chain CHJ including several JTAG cells or controllers 11, 11a, 11b, etc. respectively associated with different components of the system on chip.

In the example described here, the test access port (TAP) 10 is linked to the first JTAG controller 11 which, in response to a first command (expressed as a succession of bits) received in a register no of this controller 11, will copy this command into a register 12 accessible by the central processing unit 13.

The system on chip here includes a bootstrap mode with debugging prohibition and an analysis mode with debugging authorization.

And, as will be seen in more detail hereinbelow, as long as the system on chip is not placed in its analysis mode with debugging authorization, it is only possible to access, via the JTAG access port 10, the first JTAG controller 11. By contrast, it is impossible to access the other controllers 11a, 11b, etc. of the JTAG chain CHJ to be able to proceed with the debugging.

The control of the topology of the CHJ chain so as to render certain parts of this chain inaccessible as a function of signals is well known to the person skilled in the art and will not be described here in more detail.

In this respect, the system includes a control circuit configured to, when the system has never been placed in its analysis mode with debugging authorization, perform the following steps: a) in response to each reset or power-up of the system and in the absence of reception on the test access port of a first command accompanied by a first valid password, take a first state in which the control circuit is able to place the system in bootstrap mode with debugging prohibition; and b) in the presence of a reception on the test access port, of the first command accompanied by the first valid password following a reset or a power-up, take a second state in which the control circuit is able to place the system in its analysis mode with debugging authorization, and keep the system in this analysis mode with debugging authorization as long as a second command accompanied by a second valid password is not received via the JTAG access port 10.

The control circuit, whose structure and functionality will be returned to in more detail, is thus advantageously accessible from the outside of the system on chip 1 only via the test access port 10.

Moreover, the control circuit may be distributed at least in the processing unit 13, the bootstrap memory 14, the memory of single-write type 151 and in a hardware circuit 150, 152 able to cooperate with the processing unit and the memory of single-write type 151.

Moreover, the control circuit includes a program code housed in the bootstrap memory 14.

Reference is now made more particularly to FIGS. 2 to 17 to describe in more detail implementations of a method for managing product return for analysis, the product or component including a system on chip of the type of that illustrated in FIG. 1, this management method being applied by the control circuit.

It is recalled here that the system on chip is considered as being "closed", that is to say only accessible via the JTAG access port 10 and that the fuse memory 151 includes sensitive data of the user for which there is desire to preserve the confidentiality.

As indicated above, the fuse memory 151 has two locations intended to respectively store the first reference bit BRF1 and the second reference bit BRF2.

Each of these two reference bits is initially considered as being at the logic 0 value (corresponding to their not "blown" state in the memory of single-write type).

Moreover, as will be seen hereinbelow, the logic value of the first reference bit BRF1 signifies the switch or not to the analysis mode with debugging authorization whereas the logic value of the second reference bit BRF2 signifies "restoration" of the system on chip to its "closed" state after its analysis and before return to the user.

Figure 2:
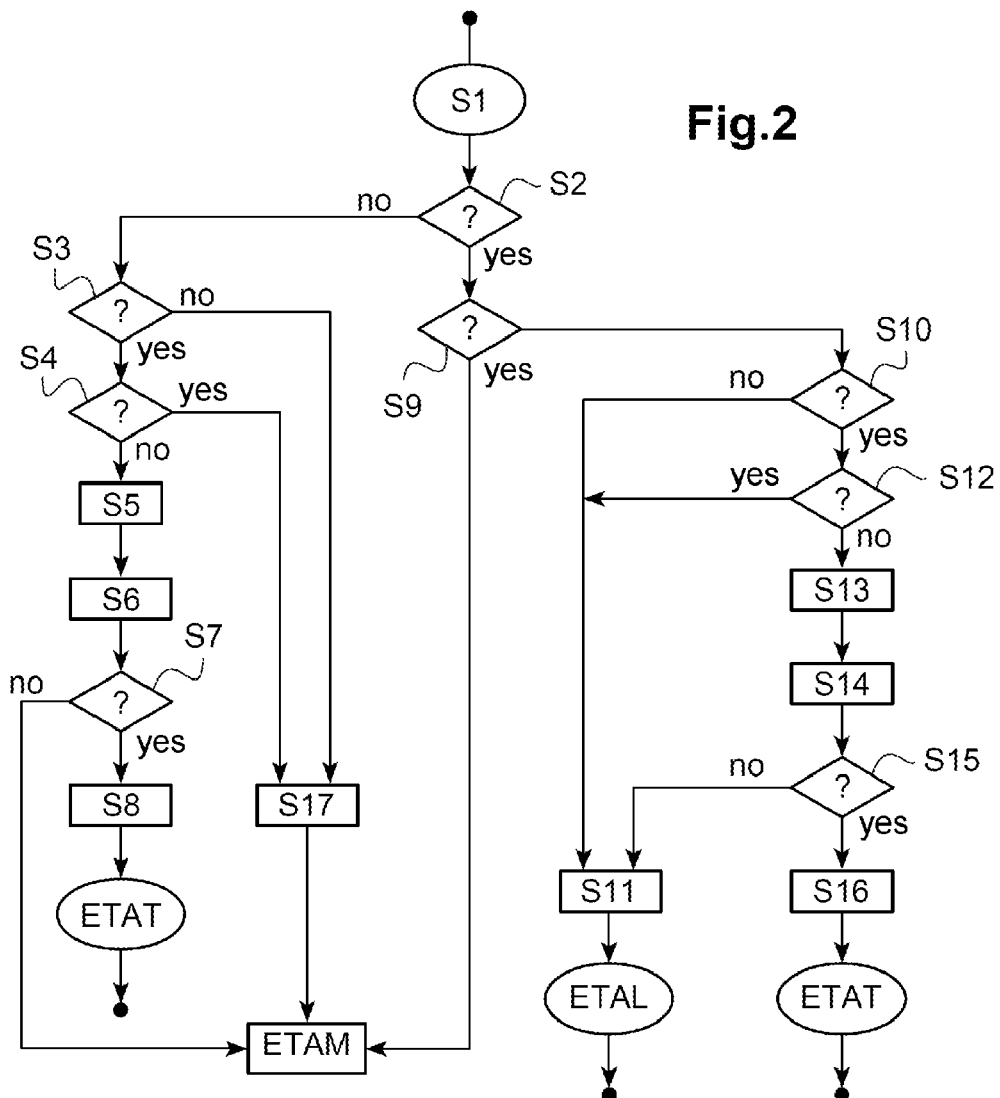
Figure 3:
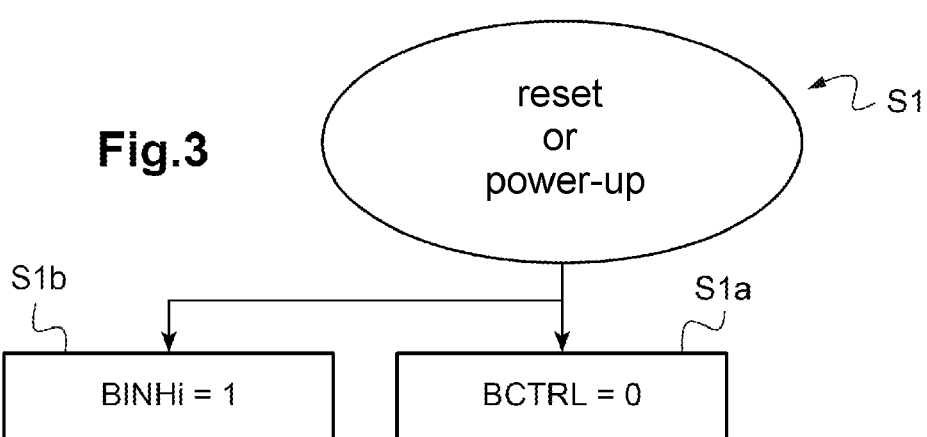
Figure 4:
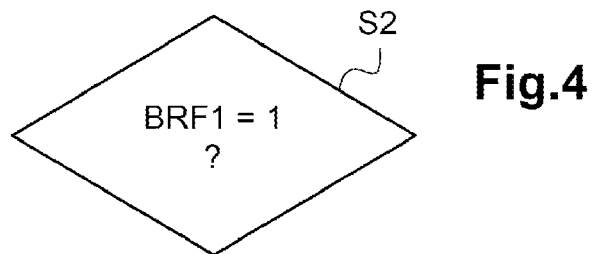

As illustrated in FIGS. 2 and 3, in the step S1, the case is assumed of a reset of the system on chip or of a power-up of this system.

At this stage, the debugging is not authorized, which is reflected by the setting to 0 of at least one control bit BCTRL (step S1a). In practice, this control bit is a bit which will authorize the testing of the product (DFT: "Design For Test") and which will make it possible to open or not the JTAG chain CHJ to be able to have access to the other controllers of this chain.

Thus, in the present case, if the bit BCRTL is at 0, the chain CHJ is closed and it is not possible to have access to the other controllers 11a, 11b etc. of this chain.

By contrast, when the bit BCRTL is set to 1, then it will be possible to authorize the debugging by thus authorizing the access to the other controllers of the JTAG chain.

In this example, for simplification purposes, only a single control bit BCTRL is cited. That said, in practice, other debugging control bits could be used.

Moreover, at this stage also, a logic value equal here to 1 (Sib) is conferred on inhibition bits (the functionality of which will be detailed more hereinbelow).

This logic value is chosen as a function of the implementation of inhibition circuit which will be detailed hereinbelow.

Then, in the step S2 (FIG. 2 and FIG. 4) the logic value of the first reference bit BRF1 is verified.

It is assumed here that the first reference bit BRF1 does not have its first logic value, here the value 1, which signifies on the one hand that it has never been blown in the memory of single-write type 151, and that, on the other hand, the system on chip has never yet switched to its analysis mode with debugging.

In this case, the control circuit goes onto the step S3 in which the control circuit verifies or not the reception of a first command CMD1 (FIG. 5) aiming to request the switching of the system on chip to its analysis mode with debugging authorization.

Figure 5:
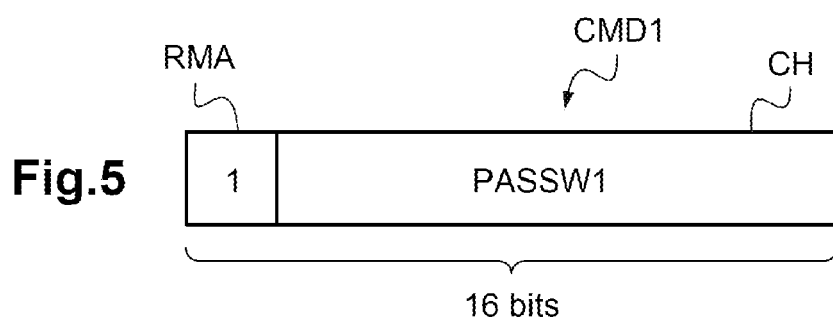

As illustrated in FIG. 5, the first command CMD1 for example includes a 16-bit word having, as header, an RMA bit followed by a 15-bit field CH containing a first password PASSW1.

In this example, the value 1 of the RMA bit signifies that this command CMD1 will effectively be a command for the switching of the system on chip to its analysis mode with debugging authorization.

Figure 6:
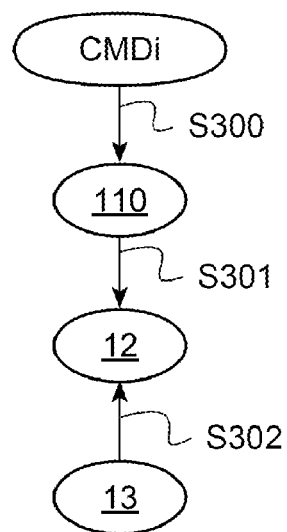
Figure 7:
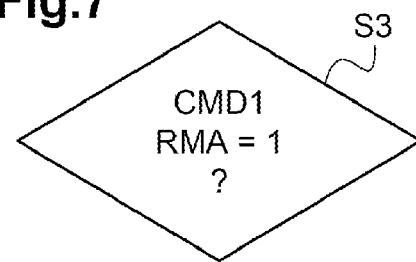
Figure 8:
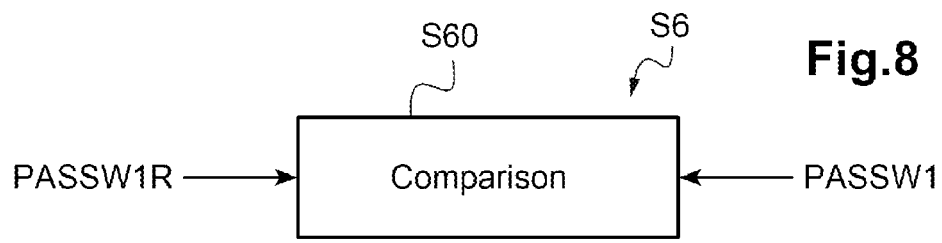

In practice, as illustrated in FIG. 6, when a command CMD1 arrives on the test access port 10, it is loaded by the controller 11 into the register 110 (step S300) then copied into the register 12 (step S301) so as to be able to be read by the processing unit 13 (step S302).

In step S3 (FIG. 2 and FIG. 7), the control circuit therefore verifies whether the RMA bit is actually at 1.

It will be seen hereinbelow that the first password received in the command CMD1 will be compared with a first reference password PASSW1R stored in a location of the fuse memory 151.

And, in a preferred, but not essential, embodiment, three tests are authorized to perform this comparison.

Also, in step S4, the control circuit verifies that the number of tests has not expired.

If the authorized number of tests has not expired, then, this number is incremented in the step S5, for example by blowing a bit in the fuse memory then, in the step S6 (FIG. 2 and FIG. 8), the control circuit performs the comparison S60 between the first password received PASSW1 and the first reference password PASSW1R stored in the fuse memory 151.

If the comparison has failed, then the control circuit places the system on chip in its ETAM state of bootstrap without debugging authorization.

A new test can be performed after reset or power-up of the chip in the step S1 to run through the steps S2, S3, S4, S5, S6, S7 again.

Assuming that the comparison between the first password received PASSW1 and the stored first reference password PASSW1R is a success, then the first password received is considered as being a valid password and the control circuit executes the step S8 (FIG. 9).

In this step S8, the control circuit commands the setting to 1 of the first reference bit BRF1 in the corresponding location of the memory 151.

This switch to the logic state 1 of the bit BRF1 is therefore permanent and final.

Then, the central processing unit 13 proceeds with the erasure (step S801) of the shadow registers 150.

In the step S802, the logic 0 value is assigned to the inhibition bits BINHi while initially, in the step S1, they were assigned the logic 1 value.

Consequently, this means that the reloading of the shadow registers with the content of the fuse memory, the reading in the shadow registers and the writing in the shadow registers have then been inhibited.

This inhibition process and the structure of the corresponding inhibition circuit will be explained in more detail hereinbelow.

Whatever the case, at this stage, the confidential data and/or secrets of the user stored in the fuse memory are no longer accessible by the central processing unit because they can no longer be copied into the shadow registers.

It would therefore be possible at this stage to already authorize the debugging.

That said, for the purposes of simplifying the number of paths of the flow diagram illustrated in FIG. 2 and to restart from a "clean" state, the debugging is still not authorized, that is to say, in the step S803, the control bit or bits BCTRL is/are maintained at their logic 0 value.

Then, the system on chip is then in a waiting state ETAT.

Upon the next reset or power-up, the control circuit is once again able to execute the step S1 (FIG. 3). Then, as in step S2, the first reference bit BRF1 has its first logic value, for example the value 1, the control circuit goes onto the step S9 in which they verify the logic value of the second reference bit BRF2 (FIG. 10).

Since this second reference bit BRF2 still has its logic 0 value, the control circuit then go on to the step S10 (FIG. 11) in which they verify the reception or not on the test input port 10 of a second command CMD2 representative of a request to "reclose" the product after analysis.

This second command CMD2 is illustrated in FIG. 12 and, in this example, has a structure similar to that of the first command CMD1. In other words, it includes, as header, the RMA bit having the logic 1 value followed by a second password PASSW2 which in practice is different from the first password PASSW1 but which could in theory be identical to this first password PASSW1.

It is now assumed that this second command CMD2 has not been received on the test access port 10.

Consequently, the control circuit goes onto the step S11 illustrated in FIG. 13.

In this step S11, the control circuit proceeds once again to erase the shadow registers 150 (step S1100). Then, the information contained in the fuse memory is once again secured by assigning the inhibition bits BINHi the value 0 (step S1101).

By contrast, this time, the value 1 is conferred on the control bit(s) BCTRL (step S1102) which authorizes the opening of the test chain CHJ and the access to the other controllers 11a, 11b, etc. of this chain so as to authorize the debugging of the system on chip.

At this stage, the system on chip is therefore placed in its analysis mode with debugging authorization ETAL.

And this placement in the ETAL mode, with inaccessibility of the confidential data, has been performed independently of any software application of the user of the system on chip, that is to say without it being necessary to execute any application of the user on the central processing unit 13.

It is then possible to perform this debugging for as long as is desired as long as the second command CMD2 has not been received on the test access port 10.

In other words, the system on chip is placed in its analysis mode with debugging authorization ETAL permanently as long as this second command CMD2 has not been received, and this is so even if there are successive resets or power-ups.

In effect, as illustrated in FIG. 2, after each reset or power-up (step S1), the control circuit will successively work through the steps S2, S9, S1n and S11.

By contrast, in case of reception of the second command CMD2 on the test access port 10, the latter is stored in the register 12 so as to be able to be read by the central processing unit 13. This storage is performed in the same way as was described with reference to FIG. 6 for the first command CMD1.

Here again, the second password received PASSW2 will be compared with the second reference password PASSW2R stored in a location of the fuse memory 151.

Here again, in a way similar to what has been described above, three tests can be authorized for this comparison.

Consequently, the flow diagram contains the steps S12 and S13 similar to the steps S4 and S5.

Assuming that the number of tests has not expired, the control circuit then goes onto the step S14 (FIG. 2 and FIG. 14) in which they proceed with the comparison S140 between the second password PASSW2 and the second reference password PASSW2R.

It should be noted here that, in case of failure of this comparison or if the number of tests has exceeded the maximum number of tests authorized, then the control circuit returns to the step S11 and therefore keep the system in its analysis mode with debugging authorization ETAL.

In the case where the comparison performed in the step S14 is a success, (verification done in the step S15), then the control circuit goes onto the step S16 (FIG. 2 and FIG. 15).

In this step, the control circuit permanently confers on the second reference bit BRF2 its second reference logic value, in this case the logic 1 value which means that the system on chip has been "reclosed".

The control circuit also secures this operation by conferring on the three inhibition bits BINH2 associated with the memory location containing the second reference bit BRF2, the value 0, which inhibits the reloading of corresponding shadow register with the content of the memory location containing the second reference bit BRF2, and the writing and the reading of this shadow register.

Then, the system is then placed in a waiting state ETAT similar to the waiting state ETAT which followed the step S8.

And, on the reset or the power-up of the system on chip, the control circuit will then in succession go through the steps S1, S2 and S9 to, since the second reference bit BRF2 is at 1, place the system on chip in its bootstrap with debugging prohibition state ETAM.

Before detailing the operations performed in this bootstrap state ETAM, it should be noted that this bootstrap state ETAM can also be reached in the case where, in the step S3, the first command CMD1 is not received or even if, in the step S4, the number of authorized tests has exceeded the maximum authorized value without successful comparison. This means simply that, in this case, the switch to the analysis mode with debugging authorization will not be authorized, but there will simply be a conventional booting of the system on chip. Furthermore, as illustrated in FIG. 16, before placing the system on chip in its ETAM state, here again the logic 0 value of the first reference bit BRF1 will be secured by conferring the logic 0 value on the three inhibition bits BINH1 which are assigned to it (step S171).

In other words, here again, the central processing unit will not be able to access or modify, via the corresponding shadow register, the logic value of the first reference bit BRF1.

In the bootstrap mode with debugging prohibition ETAM, the control circuit maintains the value 0 for the control bit or bits BCTRL and advantageously apply a step S1000 of authentication of the user bootstrap code before being able to proceed with the actual booting (S1001) of the central processing unit with the user bootstrap code.

Obviously, once the user bootstrap code is operational, the user will be free to authorize or not a debugging of the system on chip since, this time, it is he or she controlling the initiative therefor. By contrast, the embodiments make it possible, when the system on chip is restored to the manufacturer or to the designer for an analysis with debugging, to authorize this debugging but only after having secured the confidential data stored in the fuse memory such that the latter are not accessible during the debugging.

Moreover, once the first reference bit BRF1 has had its first logic value (here 1) conferred on it and the second reference bit has had its second reference logic value (here 1 for example) conferred on it, note that it is no longer possible for the control circuit to place the system in its analysis mode with debugging authorization. In effect, in this particular case, following each reset or power-up, the control circuit will automatically place the system in its bootstrap mode with debugging prohibition ETAM.

Figure 18:
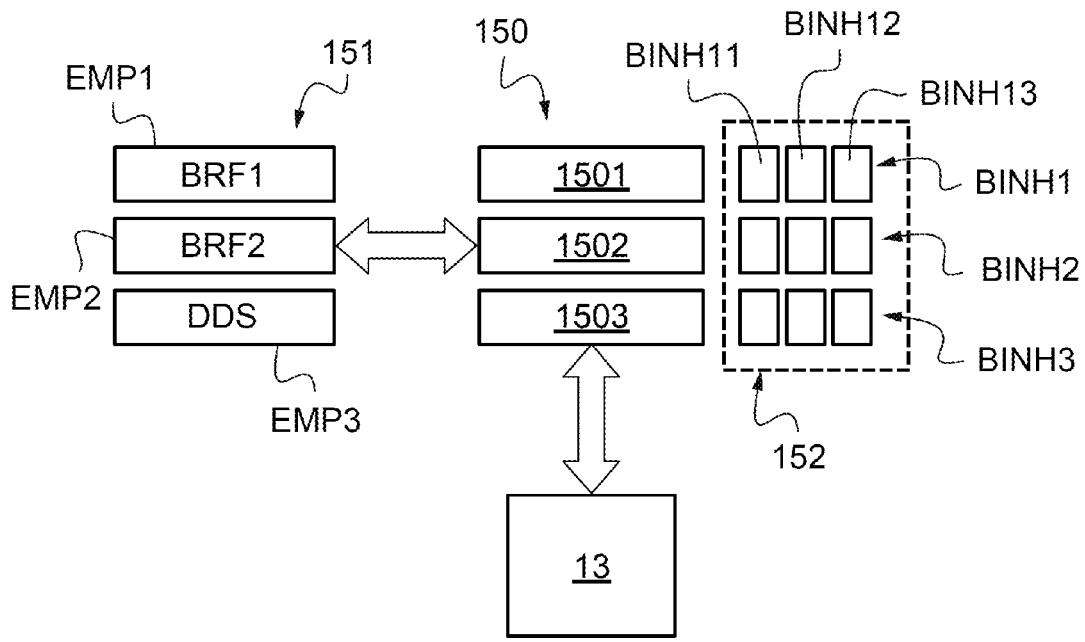
Figure 19:
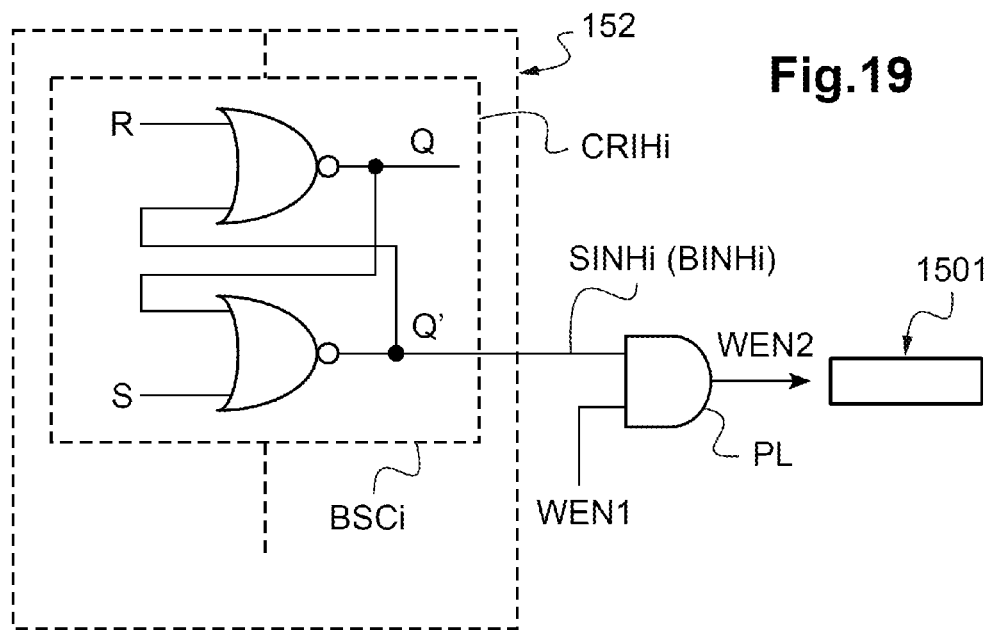

Reference is now made more particularly to FIGS. 18 and 19 to illustrate an example of hardware implementation of the inhibition circuit 152.

As illustrated in FIG. 18, the memory of single-write type 151 includes various memory locations EMP1, EMP2, EMP3, etc.

As a nonlimiting example, a first location EMP1 is intended to contain the first reference bit BRF1.

A second location EMP2 is intended to contain the second reference bit BRF2 and one or more other locations EMP3 are intended to contain the sensitive data DDS whose confidentiality is to be preserved, including in particular the first reference password PASSW1R and the second reference password PASSW2R.

These memory locations EMP1 have associated shadow registers (represented here schematically by three rectangles) 1501, 1502, 1503, etc.

These shadow registers are accessible by the central processing unit 13 which can read the content thereof and write therein.

The central processing unit 13 can also access the content of the memory of single-write type 151 via these shadow registers, the latter being able to be reloaded by the content of the memory locations EMP1, EMP2, EMP3, etc.

Each shadow register, in this example, has an associated triplet of inhibition bits.

Thus, the triplet of inhibition bits BINH1 is associated with the shadow register 1501 itself associated with the first memory location EMP1.

Each triplet of inhibition bits includes three inhibition bits respectively intended to authorize or inhibit the reading in the corresponding shadow register, the writing in this corresponding shadow register and the reloading of this corresponding shadow register with the content of the corresponding memory location.

Thus, the bit BINH11 is associated with the reading operation, the bit BINH12 is associated with the writing operation, and the bit BINH13 is associated with the reloading operation. And, depending on the logic value of these inhibition bits, it will be possible to authorize or prohibit the corresponding operation in the corresponding shadow register.

A more detailed, nonlimiting example of hardware implementation of the inhibition circuit 152 is illustrated in FIG. 19.

More specifically, the inhibition circuit 152 includes, for each inhibition bit, and therefore for each operation of the corresponding register, a hardware circuit CRIHi here including an RS flip-flop referenced BSCi.

And, the output of this flip-flop BSCi, will deliver a logic signal SINHi (corresponding to the inhibition bit BINHi) which will, in this example, be delivered to a logic gate PL of the AND type.

The other input of this logic gate PL receives the activation signal of the corresponding operation to be performed in the shadow register 1501.

In the example described here, the operation to be prohibited or authorized is a writing operation activated by a write activation signal WEN1 originating from the central processing unit 13.

And, the write authorization or prohibition signal WEN2, which will actually be delivered to the corresponding input of the register 1501, will be delivered by the output of the logic gate PL.

The input R of the flip-flop BSCi is intended to receive the reset command.

Consequently, the input R is at the logic 0 state in the presence of a reset, but also in the presence of a power-up of the system on chip.

The input S of the flip-flop is linked to the central processing unit 13.

When the control circuit wants to activate the inhibition circuit, an inhibition request logic signal in the high state is delivered to the input S.

When this is the case, the output Q' of the flip-flop BSCi switches to the low state.

And consequently, the output of the logic gate PL switches to the low state.

The logic signal SINHi is therefore in the low state which corresponds to the logic 0 value for the inhibition bit BINHi.

Consequently, the signal WEN2 switches to the low state, in the present case, which prohibits the writing operation in the register 1501.

Consequently, given this hardware implementation, an inhibition bit BINHi having the logic 1 value authorizes the writing in the corresponding register (in as much of course as the signal WEN1 is in the high state) whereas the switch from the logic 1 value of the bit BINHi to the logic 0 value prohibits the writing in the register.

And, it will be noted that the switching of the bit BINHi from the logic 1 state to the logic 0 state is irreversible unless the signal R switches to the 0 state (which occurs in a reset or power-up case) because, in this case, the output Q', and consequently the bit BINHi, switch back to the logic 1 state.

The implementations and embodiments are not limited to those which have just been described, but encompass all the variants.

It would be possible to authorize several analysis and restoration cycles, for example by providing at least one first additional reference bit and at least one second additional reference bit, each pair of first and second additional reference bits being assigned to an additional analysis and restoration cycle.

In other words, the processing operations which have been described above and which were applied to the first and second reference bits, would then be applied to each pair of additional reference bits, by using passwords identical to or different from those in the first analysis and restoration cycle.

Although a method for managing return of a product including a system on chip in the closed state and including sensitive data has been described, it would be possible in other applications, to dispense with the additional security provided by the inhibition circuit.

Moreover, the use of a command with a valid password associated with the blowing a reference bit to keep the system on chip in a state of analysis with debugging authorization, could be applied to any system on chip, whether the latter contains or does not contain sensitive data. And, this feature facilitates the access to the analysis mode with debugging authorization because it is not then necessary on each reset or on each power-up to again re-enter a password.

Furthermore, although a memory circuit 151 has been described that contains only memory of single-write type storing not only the first and second reference bits BRF1 and BRF2, but also the sensitive data and/or secrets as well as the reference passwords PASSW1R and PASSW2R, it would be possible as a variant to provide a memory circuit containing, on the one hand, memory of single-write type and, on the other hand, first memory not necessarily of single-write type, for example a non-volatile internal memory not necessarily of single-write type.

In such a variant, the memory of single-write type would store at least the first and second reference bits so as to ensure the irreversible and permanent nature of this storage, and possibly the reference passwords and some sensitive data while the other sensitive data and/or secrets could be stored in the first memory.

It would also be possible to store all the sensitive data and/or secrets as well as the reference passwords in the first memory and to reserve the storage in the memory of single-write type for only the first and second reference bits.

What is claimed is:

1. A method for operating an electronic component, the method comprising:
   determining whether the electronic component is permitted to undergo debugging in an analysis mode of operating the electronic component;
   after a reset or power-up of the electronic component, in response to determining that a first password received at a test access port is valid and the electronic component is permitted to undergo debugging in an analysis mode, placing the electronic component in the analysis mode with debugging authorization while having no access to sensitive data stored in a memory of the electronic component; and
   after the reset or power-up of the electronic component, in response to determining that the electronic component is not permitted to undergo debugging in the analysis mode, placing the electronic component in a bootstrap mode of operating the electronic component, wherein, in the bootstrap mode, the electronic component provides no access to debugging while having access to the sensitive data stored in the memory of the electronic component.

2. The method of claim 1, wherein determining whether the electronic component is permitted to undergo debugging in the analysis mode comprises:
   after a reset or power-up of the electronic component, receiving a first command accompanied by a first password at a test access port of the electronic component;
   in response to determining that the first password is valid, placing the electronic component in a waiting mode with debugging prohibition; and
   after another reset or power-up of the electronic component, placing the electronic component in the analysis mode.

3. The method of claim 2, wherein placing the electronic component in the waiting mode comprises:
   comparing the first password with a first reference password stored in a first memory of the electronic component;
   designating the first password as being a first valid password in response to a determination that the first password matches the first reference password;
   storing a first reference bit having a first reference logic value in a memory of single-write type in response to the determination that the first password matches the first reference password; and
   prohibiting a debugging of the electronic component.

4. The method of claim 3, wherein placing the electronic component in the analysis mode comprises
   verifying that the first reference bit comprises the first reference logic value; and
   authorizing the debugging of the electronic component in response to the first reference bit comprising the first reference logic value.

5. The method of claim 3, wherein the first memory is the memory of single-write type storing the first reference bit.

6. The method according to claim 3, wherein determining whether the electronic component is permitted to undergo debugging in the analysis mode comprises determining that the electronic component has never before been placed in the analysis mode with debugging authorization, and wherein determining that the electronic component has never before been placed in the analysis mode with debugging authorization comprises determining that the first reference bit has a logic value different from the first reference logic value.

7. The method of claim 1, wherein determining whether the electronic component is permitted to undergo debugging in the analysis mode comprises determining that the electronic component has never before been placed in the analysis mode with debugging authorization.

8. The method of claim 1, wherein determining whether the electronic component is permitted to undergo debugging in the analysis mode comprises:

after a reset or power-up of the electronic component, receiving a second command accompanied by a second password at the test access port of the electronic component;

determining that the electronic component is not permitted to undergo debugging in the analysis mode in response to determining that the second password is valid; and in response to determining that the electronic component is not permitted to undergo debugging, placing the electronic component in a waiting mode with debugging prohibition; and after another reset or power-up of the electronic component, placing the electronic component in the bootstrap mode.

9. The method according to claim 8, further comprising:

comparing the second password with a second reference password stored in a first memory of the electronic component;

designating the second password as being a second valid password in response to a determination that the second password matches the second reference password; and storing a second reference bit having a second reference logic value in a memory of single-write type in response to the determination that the second password matches the second reference password.

10. The method according to claim 9, further comprising:

wherein the electronic component is placed in the waiting mode with debugging prohibition after storing the second reference bit having the second reference logic value, the second reference bit assigned the second reference logic value; and wherein after the after another reset or power-up, verifying that the second reference bit comprises the second reference logic value and placing the electronic component in the bootstrap mode with debugging prohibition in response to the second reference bit comprising the second reference logic value.

11. The method according to claim 1, wherein the electronic component comprises a central processing unit, a memory circuit comprising a first memory and a memory of single-write type, and volatile registers associated with the memory circuit, the volatile registers configured to comprise the sensitive data, and wherein before placing the electronic component in the analysis mode with debugging authorization, the placing comprises erasing content of the volatile registers, inhibiting reading of the volatile registers, writing in the volatile registers, and reloading of the volatile registers.

12. The method according to claim 11, wherein the inhibiting comprises switching an inhibition bit from a first logic value to a second logic value, and wherein, after the inhibition bit is switched from the first logic value to the second logic value, only a reset or a power-up of the electronic component causes the inhibition bit to return to the first logic value.

13. The method according to claim 1, wherein determining whether the electronic component is permitted to undergo debugging in the analysis mode comprises: verifying a logic value of a control bit, wherein debugging is prohibited when the control bit has a first control logic value, wherein debugging is authorized when the control bit has a second control logic value, wherein, following each reset or power-up of the electronic component, the first control logic value is conferred on the control bit, and wherein the first control logic value is maintained in the bootstrap mode with debugging prohibition.

14. An electronic component comprising:

a processor;

a memory comprising a first memory of single-write type storing sensitive data and a second memory storing instructions to be executed in the processor, the instructions when executed in the processor configured to:

determine whether the electronic component is permitted to undergo debugging in an analysis mode of operating the electronic component;

after a reset or power-up of the electronic component, in response to determining that a first password received at a test access port is valid and the electronic component is permitted to undergo debugging in an analysis mode, place the electronic component in the analysis mode with debugging authorization while having no access to the sensitive data stored in the first memory; and after the reset or power-up of the electronic component, in response to determining that the electronic component is not permitted to undergo debugging in the analysis mode, place the electronic component in a bootstrap mode of operating the electronic component, wherein, in the bootstrap mode, the electronic component provides no access to debugging while having access to the sensitive data stored in the first memory.

15. The electronic component of claim 14, wherein instructions to determine whether the electronic component is permitted to undergo debugging in the analysis mode comprise instructions to after a reset or power-up of the electronic component, receive a first command accompanied by a first password at a test access port of the electronic component;

in response to determining that the first password is valid, place the electronic component in a waiting mode with debugging prohibition; and after another reset or power-up of the electronic component, place the electronic component in the analysis mode.

16. The electronic component of claim 15, wherein the instructions to place the electronic component in the waiting mode comprises instructions to compare the first password with a first reference password stored in a first memory of the electronic component;

designate the first password as being a first valid password in response to a determination that the first password matches the first reference password;

store a first reference bit having a first reference logic value in a memory of single-write type in response to the determination that the first password matches the first reference password; and prohibit a debugging of the electronic component; and wherein instructions to place the electronic component in the analysis mode comprises instructions to verify that the first reference bit comprises the first reference logic value; and authorize the debugging of the electronic component in response to the first reference bit comprising the first reference logic value.

17. The electronic component of claim 14, wherein instructions to determine whether the electronic component is permitted to undergo debugging in the analysis mode comprise instructions to after a reset or power-up of the electronic component, receive a second command accompanied by a second password at the test access port of the electronic component;

determine that the electronic component is not permitted to undergo debugging in the analysis mode in response to determining that the second password is valid; and in response to determining that the electronic component is not permitted to undergo debugging, place the electronic component in a waiting mode with debugging prohibition; and after another reset or power-up of the electronic component, placing the electronic component in the bootstrap mode.

18. The electronic component of claim 14, wherein the instructions to determine whether the electronic component is permitted to undergo debugging in the analysis mode comprises instructions to determine that the electronic component has never before been placed in the analysis mode with debugging authorization.

19. The electronic component of claim 14, wherein the electronic component comprises a central processing unit, a memory circuit comprising the first memory and the memory of single-write type, and volatile registers associated with the memory circuit, the volatile resisters configured to comprise the sensitive data, and wherein the instructions to place further comprise prior instructions to be executed before placing the electronic component in the analysis mode with debugging authorization, the prior instructions cause the processor to erase content of the volatile registers, inhibit reading of the volatile registers, writing in the volatile registers, and reloading of the volatile registers.

20. The electronic component of claim 19, wherein the instructions to inhibit comprises switching an inhibition bit from a first logic value to a second logic value, and wherein, after the inhibition bit is switched from the first logic value to the second logic value, only a reset or a power-up of the electronic component causes the inhibition bit to return to the first logic value.

\* \* \* \* \*